(12) United States Patent
Uno

(10) Patent No.: US 6,626,492 B1
(45) Date of Patent: Sep. 30, 2003

(54) CAR SEAT

(75) Inventor: Mikio Uno, Fukuoka (JP)

(73) Assignee: Kabushiki Kaisha Taku Furniture, Fukuoka (JP)

(*) Notice: Subject to any disclaimer, the term of this patent is extended or adjusted under 35 U.S.C. 154(b) by 0 days.

(21) Appl. No.: 09/856,820

(22) PCT Filed: Sep. 20, 2000

(86) PCT No.: PCT/JP00/06454
§ 371 (c)(1),
(2), (4) Date: May 24, 2001

(87) PCT Pub. No.: WO01/23208
PCT Pub. Date: Apr. 5, 2001

(30) Foreign Application Priority Data

Sep. 27, 1999 (JP) .......................... 11-273265

(51) Int. Cl.⁷ .............................. A47C 15/00
(52) U.S. Cl. .................. 297/238; 297/113; 297/484
(58) Field of Search .................. 297/238, 484, 297/112, 113, 114, 230.13, 486, 487, 256.15, 234, 467, 468, 255

(56) References Cited

U.S. PATENT DOCUMENTS

| | | | | |
|---|---|---|---|---|
| 4,936,627 A | * | 6/1990 | Guim | 297/238 |
| 4,943,112 A | * | 7/1990 | Law | 297/238 |
| 4,986,600 A | * | 1/1991 | Leblanc et al. | 297/238 |
| 5,135,285 A | * | 8/1992 | Dukatz et al. | 297/484 |
| 5,468,046 A | * | 11/1995 | Weber et al. | 297/238 |
| 5,527,093 A | * | 6/1996 | Park | 297/238 |
| 5,700,054 A | * | 12/1997 | Lang | 297/238 |
| 5,868,462 A | * | 2/1999 | Truax | 297/129 |

FOREIGN PATENT DOCUMENTS

| | | | |
|---|---|---|---|
| JP | 59-202942 | | 11/1984 |
| JP | 60-55545 | | 4/1985 |
| JP | 4-260839 | | 9/1992 |
| JP | 4-349040 | | 12/1992 |
| JP | 5-178136 | | 7/1993 |
| JP | 5-63966 | | 8/1993 |
| JP | 6-135271 | | 5/1994 |
| JP | 6-255412 | * | 9/1994 |
| JP | 6-689964 | | 9/1994 |
| JP | 6-286510 | | 10/1994 |
| JP | 9-30301 | | 2/1997 |

* cited by examiner

Primary Examiner—Peter M. Cuomo
Assistant Examiner—Stephen Vu
(74) Attorney, Agent, or Firm—Jordan and Hamburg LLP

(57) ABSTRACT

A vehicle seat is provided for easy modification from a normal seat to a child's seat and restored from the child's seat to the normal seat and has excellent cushioning and restraining effects and a high degree of safety. The vehicle seat includes a sitting portion, an abdominal protecting pad housed in and upwardly pivotal from the sitting portion, side supporting members housed in and forwardly projectable from a seat back portion, and seat belts which can be attached to or detached from the abdominal protecting pad after being removed from the seat back portion or the side supporting members.

20 Claims, 11 Drawing Sheets

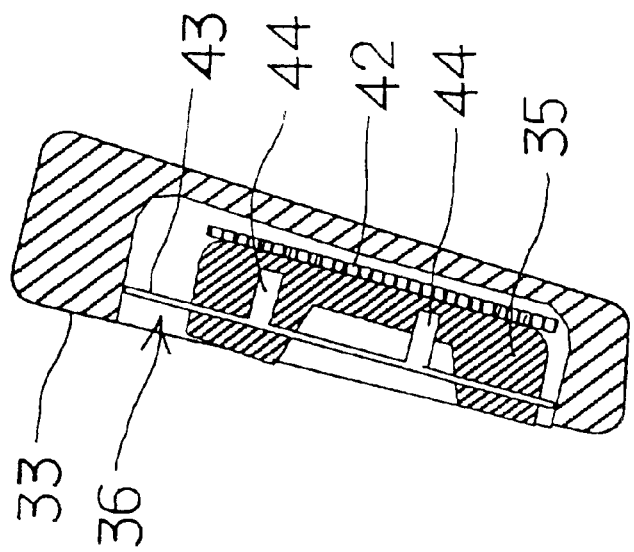
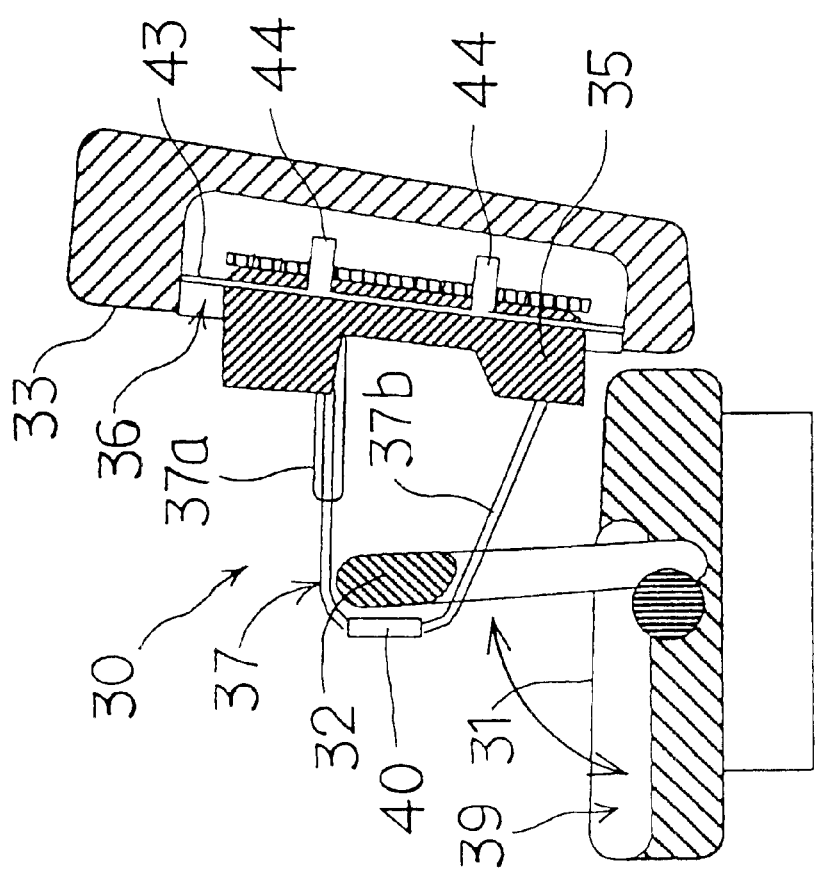
FIG. 6B
FIG. 6A

CAR SEAT

FIELD OF THE INVENTION

The present invention relates to a vehicle seat which can be selectively used as a child's seat when needed.

BACKGROUND OF THE INVENTION

When a child rides in a vehicle, a so-called child's seat, which is a separate seat for a child, is used because seat belts equipped in a vehicle seat which does not suit a height and size of a child cannot be readily used. A child's seat is typically mounted on a front passenger seat or a rear seat of the vehicle and fixed with seat belts equipped in the vehicle seat. When an adult rides in a vehicle, a mounted child's seat unnecessarily occupies space. Thus, the child's seat has to be attached and detached depending on the necessity, which leads to troublesome work. Furthermore, a child's seat which is not in use should be stored in the trunk of a vehicle or in a house, thereby requiring extra work for taking the child seat in and out of the trunk of the vehicle or the house as well as a space for storage.

In order to avoid the above problems, vehicle seats wherein members for constructing a child's seat are previously housed in a front passenger seat or a rear seat have been developed and are disclosed in Japanese Unexamined Patent Publications Nos. H4-260839, H6-135271 and H6-286510, for example. The front passenger seat or the rear seat can be modified to a child's seat by assembling the members of the child's seat when needed.

With use of the child's seat facing a seat back as disclosed in Japanese Unexamined Patent Publication No. H4-260839, a child sits facing backward. It is a problem that this results in a poor restraining effect of the head and abdomen of the child in the event of a collision involving the vehicle from the rear, i.e., a rear impact collision.

In the vehicle seats equipped-with child's seats as disclosed in Japanese Unexamined Patent Publications Nos. H6-135271 and H6-286510, the members for constructing a child's seat are housed in a seat back portion of the vehicle seat. When the members are removed and configured as a child's seat, the thickness of the seat back is insufficient to secure the necessary cushioning and restraining effects. Moreover, when a child is sitting on the seat, since the sitting position is higher than the original seat, the seat is typically shaken when driving, which may cause a child to fall out from the seat in the event of a collision involving the vehicle.

OBJECTS AND SUMMARY OF THE INVENTION

It is an object of the present invention to provide a safer vehicle seat which is easily modified from a normal seat to a child's seat and restored from the child's seat to the normal seat, and has excellent cushioning and restraining effects and a high degree of safety.

A vehicle seat according to the present invention generally comprises a sitting portion, an abdominal protecting pad which can be housed in the sitting portion and erected from the sitting portion, side supporting members which can be housed in a seat back portion and projected from the seat back portion, and seat belts which can be attached to and detached from the abdominal protecting pad and the seat back portion after being removed from the seat back portion or the side supporting members in which the seat belts are stored.

In a vehicle seat in accordance with the invention, a normal seat, i.e., a seat adapted to accommodate an adult or other normally seated passenger, can be easily modified to a child's seat by erecting the abdominal protecting pad, projecting the side supporting members from the seat back portion, removing the seat belts from the seat back portion or the side supporting members, and attaching the seat belts to the abdominal protecting pad and the seat back portion. The child's seat can be easily restored to the normal seat by performing the above steps in reverse order. When used as a child's seat, a child sits in an original sitting position with his or her buttocks and back against the sitting portion and the seat back portion which are the same as those of the normal seat, and the child's body is supported by the abdominal protecting pad, the side supporting members and the seat belts. Thus, the seat has excellent cushioning and restraining effects and a high degree of safety.

The position of either seat belts or side supporting members, or both, may be adjustable in the vertical direction so that the seat belts and side supporting members can be securely fixed depending on the size of a child who is sitting on the sitting portion, thereby further enhancing a restraining effect and safety.

The seat belts may consist of shoulder belts for holding the shoulders of a child on the sitting portion and waist belts for holding the waist of the child. By providing a two-part seat belt, the shoulders and waist of the child can be separately supported, and thus even a younger child having a small and supple body can be securely restrained.

The abdominal protecting pad may have a form which can be inserted into a substantially T-shaped concave portion or recess formed on the sitting portion and be mounted on the sitting portion about an axis which enables the abdominal protecting pad to pivot about the axis and rise from the sitting portion. As such, the abdominal protecting pad can be erected and housed in an easy manner, and there is no undesirable unevenness in the sitting portion when the abdominal protecting pad is housed, with the absence of such unevenness being effective to provide cushioning and holding effects inherent to the seat.

Furthermore, the side supporting members may have a form which can be inserted into concave portions formed on the both sides of the seat back portion and be mounted on the seat back portion about axes which enable the side supporting members to pivot about the respective axis and rise or project from the seat back portion. Thus, the side supporting members can be erected and housed in an easy manner, and there is no undesirable.unevenness in the seat back portion when the side supporting members are housed, with the absence of such unevenness being effective to provide cushioning and holding effects inherent to the seat.

BRIEF DESCRIPTION OF THE DRAWINGS

FIGS. 6A and 6B are longitudinal sectional views of the vehicle seat shown in FIG. 4;

FIGS. 8A, 8B, 8C and 8D are explanatory views showing the vehicle seat shown in. FIG. 4 in use;

DETAILED DESCRIPTION OF THE INVENTION

Figure 1:
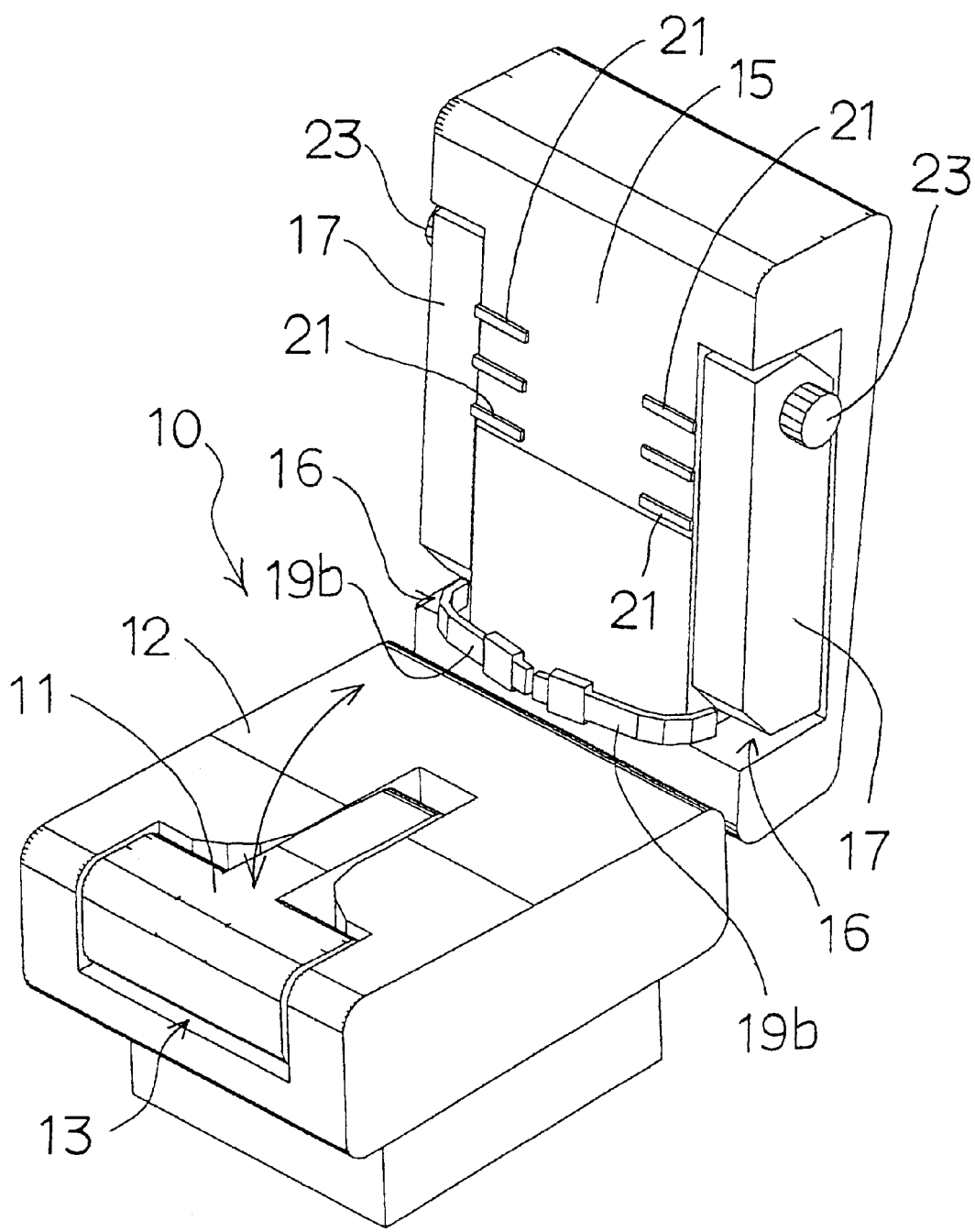
FIG. 1 is a perspective view of a first embodiment of a vehicle seat in accordance with the invention.

In a vehicle seat 10 in accordance with a first embodiment of the invention, an abdominal protecting pad 11 having a substantially T-shaped form is mounted with an axis in a concave portion 13 having a substantially T-shaped form which is formed on a sitting portion 12 such that the abdominal protecting pad 11 can rise from and be inserted into the sitting portion 12. When inserted into the sitting portion 12, the abdominal protecting pad 11 will rest on the sitting portion 12 as shown in FIG. 1. Side supporting members 17 are mounted about axes such that they are capable of being projected from and housed into concave portions 16 formed on both sides of a seat back portion 15. A pair of seat belts 19 is housed in each of the side supporting members 17.

Figure 2:
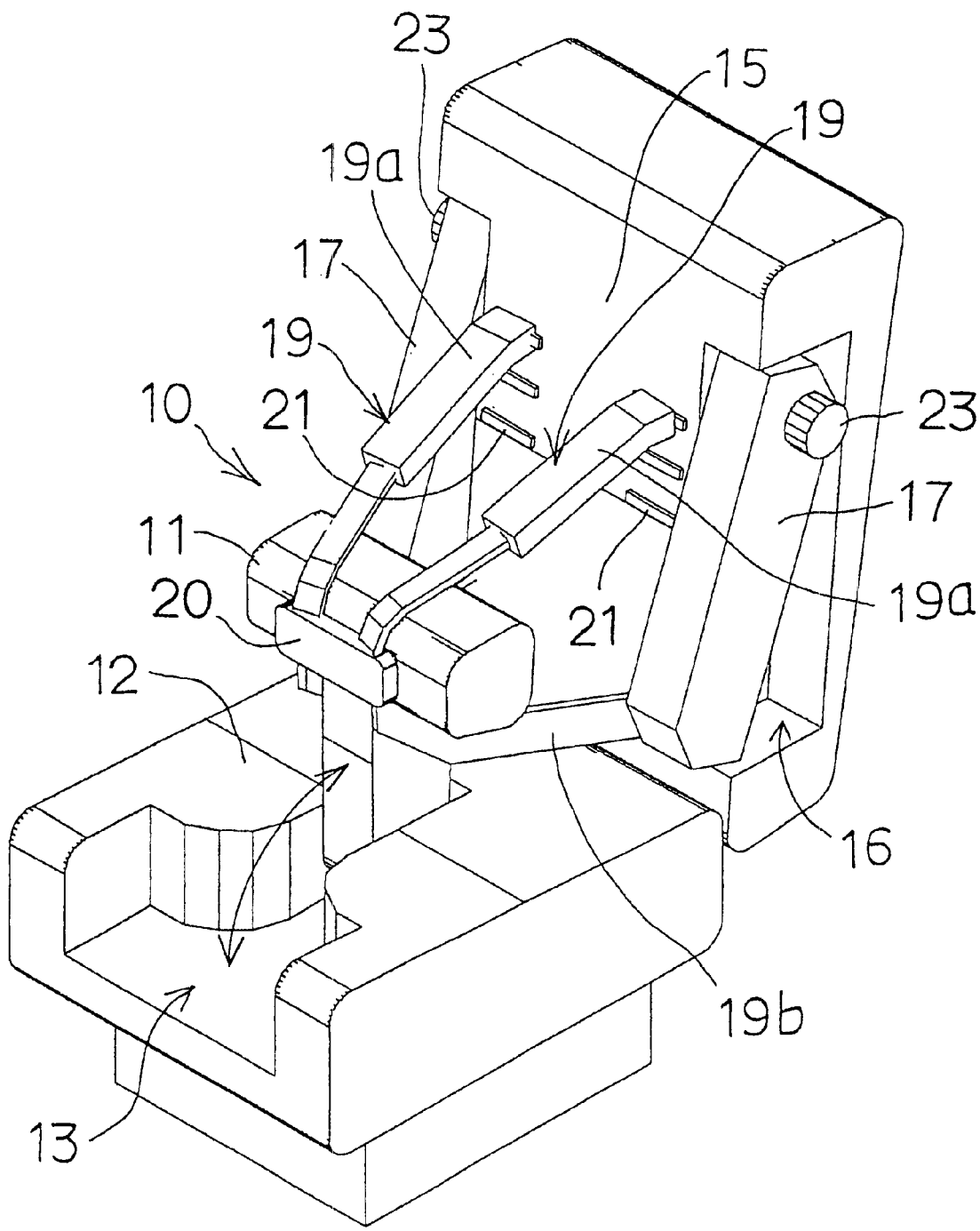
FIG. 2 is a perspective view showing the vehicle seat shown in FIG. 1 modified to a child's seat.

When an adult sits on the vehicle seat 10, as shown in FIG. 1, the abdominal protecting pad 11 is housed in the concave portion 13 on the sitting portion 12 and rests on the sitting portion 12, and the side supporting members 17 are housed in the concave portions 16 formed on the both sides of the seat back portion 15. Thus, the adult can sit on the seat as with a normal seat. In this configuration, the seat belts 19 are divided into shoulder belts 19a and waist belts 19b as shown in FIG. 2. The shoulder belts 19a are stored in-the supporting members 17, and the waist belts 19b, being connected to each other at the ends thereof, are stored near the lower end of the seat back portion 15. Reclining mechanisms and sliding mechanisms, which are standard equipment mounted in vehicles, are not interrupted, and seat belts originally mounted in a vehicle can also be used.

Figure 3:
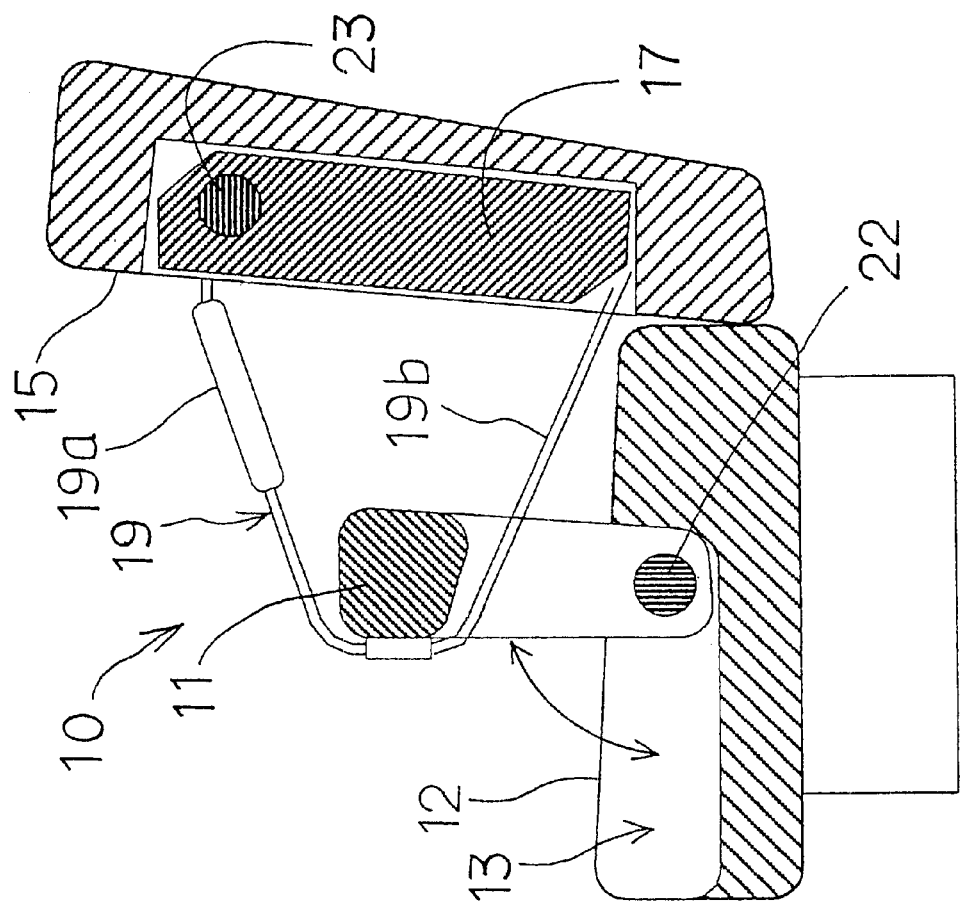
FIG. 3 is a longitudinal sectional view of the vehicle seat shown in FIG. 1.

When a child sits on the vehicle seat 10, as shown in FIGS. 2 and 3, the abdominal protecting pad 11 is erected from the sitting portion 12, and the side supporting members 17 are projected from the seat back portion 15. With a connecting member 20, the shoulder belts 19a removed from the right and left side supporting members 17 are connected to the waist belts 19b removed from the lower end of the seat back portion 15 after the connection between the waist belts 19b is released. The upper ends of the shoulder belts 19a are connected to connecting holes 21 arranged on the seat back portion 15, thereby modifying the vehicle seat to the child's seat. In this configuration, the seat belts 19 are attachably and detachably connected to the abdominal protecting pad 11 at the middle portion thereof via the connecting member 20. The upper end of each of the seat belts 19 is detachably connected to a respective one of the connecting holes 21 on the seat back portion 15.

A child who is sitting on the vehicle seat 10 in the configuration shown in FIG. 2 sits on the original sitting position with his or her buttocks and back against the sitting portion 12 and the seat back portion 15 of the original seat, and the child's body is restrained by the abdominal protecting pad 11, the side supporting members 17 and the seat belts 19. Therefore, excellent cushioning and restraining effects are obtained. Furthermore, since a child can sit at a low level which is the same level as on the original seat, he or she is not in danger of falling from the seat which results in a high degree of safety.

The seat back portion 15 may have a plurality of the connecting holes 21 at different levels so that the most suitable connecting holes 21 can be selected depending on the size of a child and coupled to the end of the seat belts 19. Thus, the seat belts 19 can fit each child's body, and the restraining effect is optimized regardless of the size of the child.

Each of the seat belts 19 consists of the shoulder belt 19a which restrains the shoulder of a child sitting on the sitting portion 12, and the waist belt 19b which restrains the waist of a child. Accordingly, the shoulders and the waist are separately restrained so that even a young child having a small and supple, body can be securely restrained.

The abdominal protecting pad 11 has a substantially T-shaped form which can be inserted into the concave portion 13 having a substantially T-shaped form, and is supported by an axis 22 of the sitting portion 12 such that the abdominal protecting pad 11 is capable of swinging. Therefore, the abdominal protecting pad 11 can be easily alternately erected and housed. In addition, when the abdominal protecting pad 11 is housed, there is no undesirable unevenness on the sitting portion 12.

The side supporting members 17 are shaped and arranged to be inserted into the concave portions 16 formed on both sides of the seat back portion 15 and supported by a respective axis 23 in the seat back portion 15 such that the side supporting members 17 are capable of swinging. Accordingly, the side supporting members 17 can be easily alternately erected and housed. In addition, when the side supporting members 17 are housed, there is no undesirable unevenness on the seat back portion 15.

As described above, when the abdominal protecting pad 11, shoulder belts 19a, waist belts 19b and the side supporting members 17 are housed in the predetermined positions, the seat is restored to the normal seat, and there is no undesirable unevenness on the sitting portion 12 or the seat back portion 15, with the absence of such unevenness being effective to provide cushioning and holding effects inherent to the original seat. In the above embodiment, the operations such as the erection and housing of the abdominal protecting pad 11 and the projection and housing of the side supporting members 17 are conducted manually. However, these are not limited to the manual operations, and may be driven by electric or hydraulic mechanisms using electric or motive power from a vehicle.

Referring now to FIGS. 4–8, in a second embodiment of the present invention, a vehicle seat 30 comprises a sitting portion 31, an abdominal protecting pad 32 housed in the sitting portion 31 and which is coupled to the sitting portion 31 such that it can rise from the sitting portion 31, side supporting members 35 housed on both sides of a seat back portion 33 and which can be projected therefrom, and seat belts 37 stored in concave portions 36 for housing the side supporting members 35 and which can be attached to and detached from the abdominal protecting pad 32 and the seat back portion 33 after being removed from the seat back portion 33.

Figure 4:
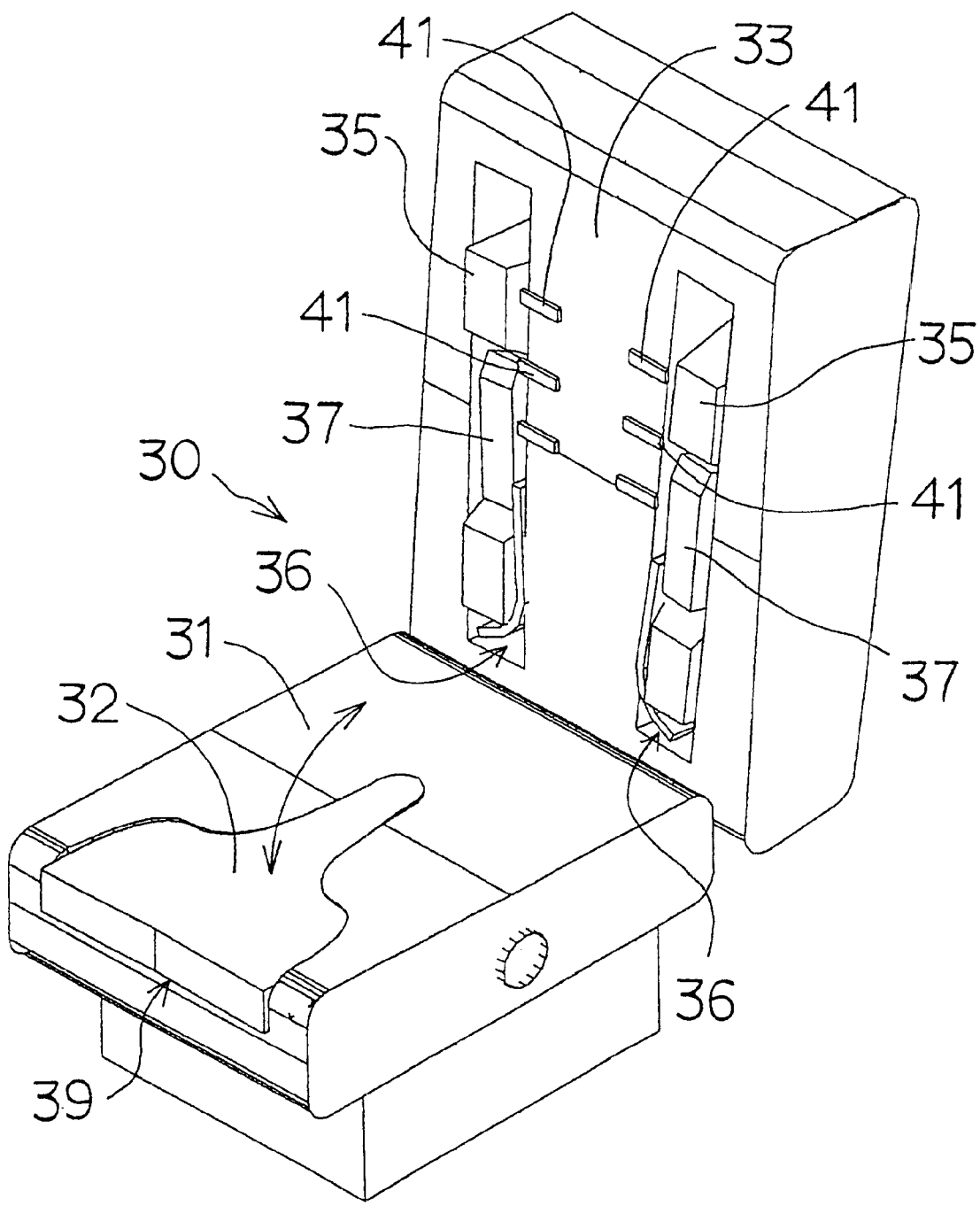
FIG. 4 is a perspective view of a second embodiment of a vehicle seat in accordance with the invention.

When an adult sits on the vehicle seat 30, as shown in FIG. 4, the abdominal protecting pad 32 is housed in a concave portion 39 in the sitting portion 31 such that the abdominal protecting pad 32 rests on a portion of the sitting portion 31. The side supporting members 35 and the seat belts 37 are housed in the concave portions 36 formed on the sides of the seat back portion 33. Thus, the seat can be used as a normal seat.

Figure 5:
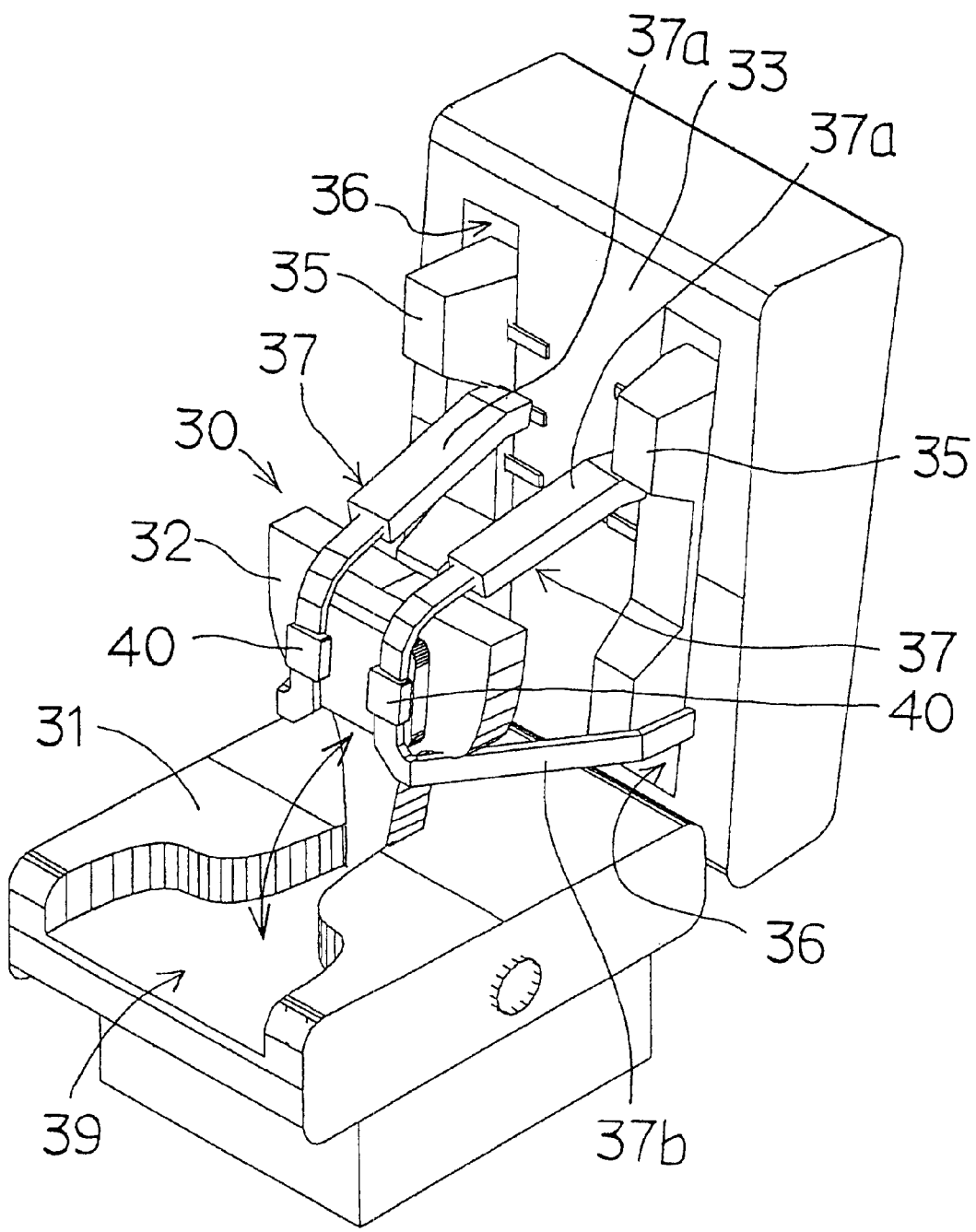
FIG. 5 is a perspective view showing the vehicle seat shown in FIG. 4 modified to a child's seat.
Figure 7:
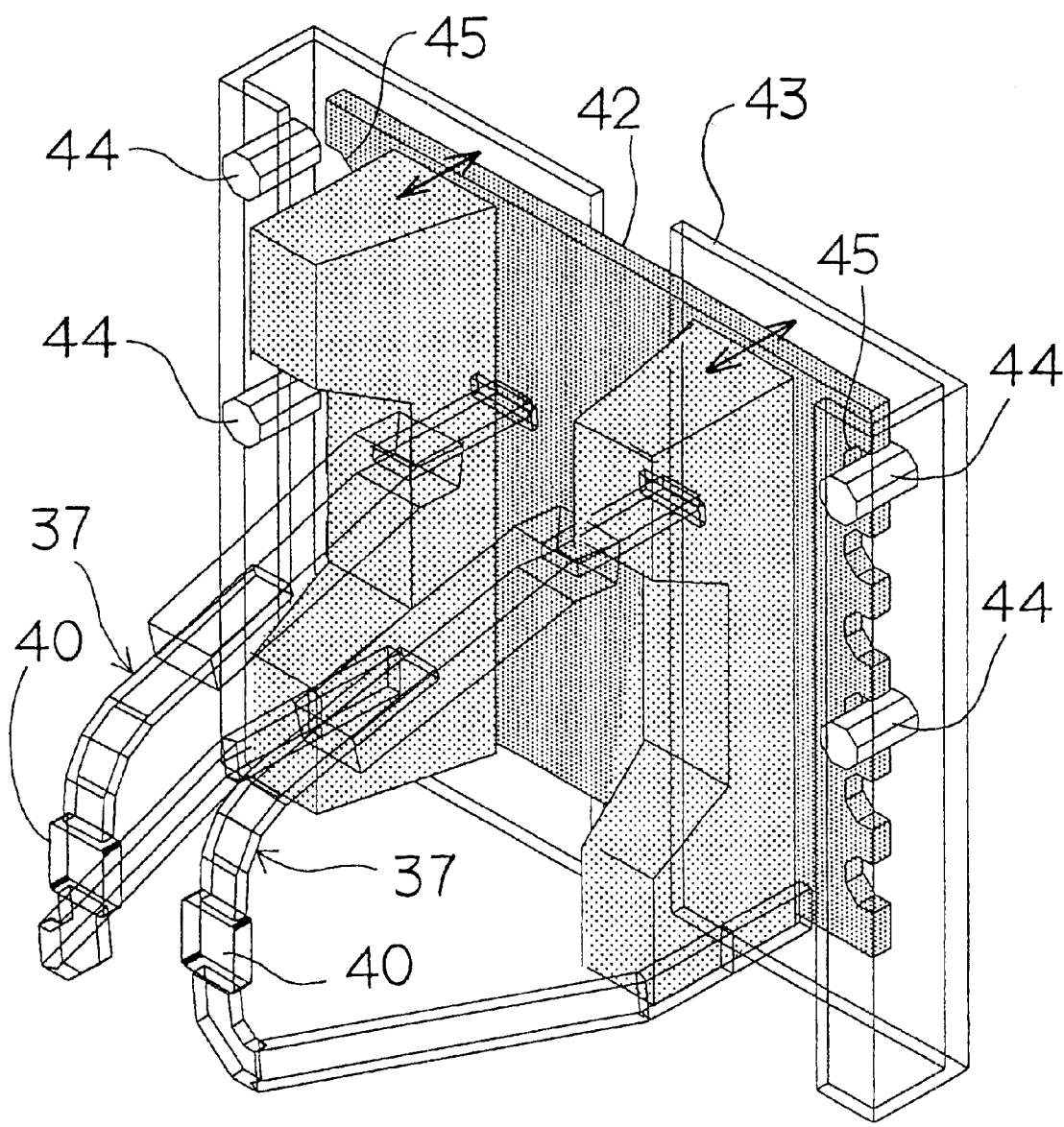
FIG. 7 is a transparent perspective view of a seat back portion of the vehicle seat shown in FIG. 4.

When a child sits on the vehicle seat 30, as shown in FIGS. 5 and 6A, the abdominal protecting pad 32 is erected from the sitting portion 31, and the side supporting members 35 are projected from the seat back portion 33. The middle portions of the seat belts 37, which are removed from the seat back portion 33, are connected to connecting means 40 on the abdominal protecting pad 32, and the ends of the seat belts 37 are connected to connecting holes 41 arranged on the seat back portion 33. Thus, the seat can be easily modified to a child's seat and, by performing these steps in reverse order, the child's seat can be easily restored to the original seat.

When the vehicle seat 30 is used as a child's seat, the child positions his or her buttocks and back against the sitting portion 31 and the seat back portion 33 of the original seat, and the child's body is restrained by the abdominal protecting pad 32, the side supporting members 35 and the seat belts 37. Therefore, excellent cushioning and restraining effects are obtained.

As shown in FIG. 6A, the lower ends of the seat belt 37 are fixed to the side supporting members 35, and the side supporting members 35 are fixed to a mounting board 42 housed in the seat back portion 33. The mounting board 42 is fixed by engaging either of a plurality of cutouts 45 formed on both sides of the mounting board 42 with guide pins 44 provided on frames 43 (see FIG. 7).

Accordingly, as shown in FIG. 6B, when inserting the side supporting members 35 into the seat back portion 33, the cutouts 45 are detached from the guide pins 44, and the mounting board 42 as well as the side supporting members 35 and the lower ends of the seat belts 37 are movable in the upward and downward directions. When adjusting the cutouts 45 to the position of the guide pins 44 and pulling out the side supporting members 35 to the front, as shown in FIG. 6A, the cutouts 45 are engaged with the guide pins 44 to determine the level fixing the side supporting members 35 and the lower ends of the seat belts 37. The level at which the ends of the seat belts 37 are connected can be varied by selecting any of a plurality of the connecting holes 41 provided on the seat back portion 33.

Figure 8A:
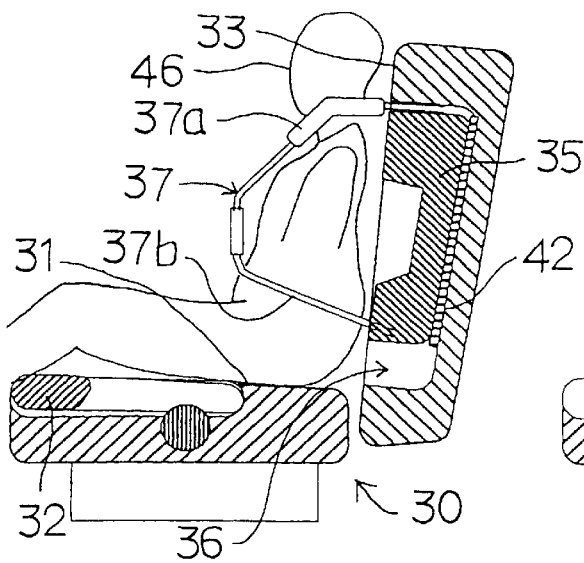
Figure 8B:
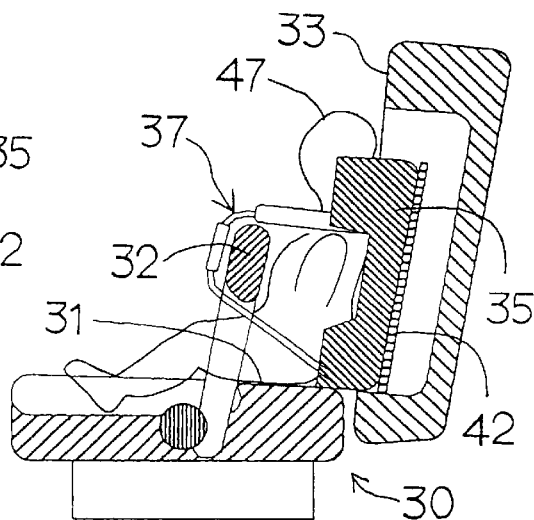
Figure 8C:
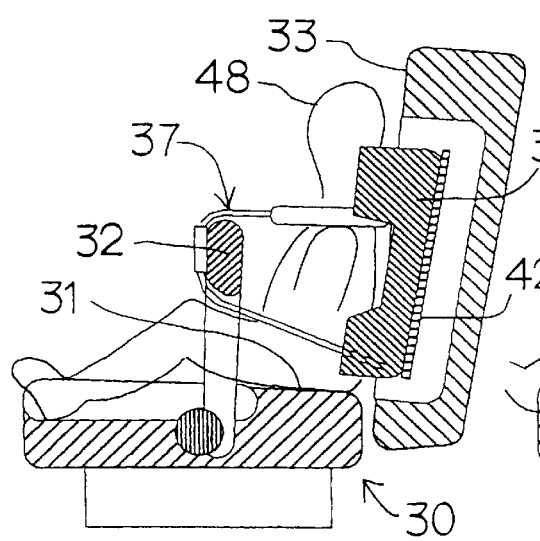
Figure 8D:
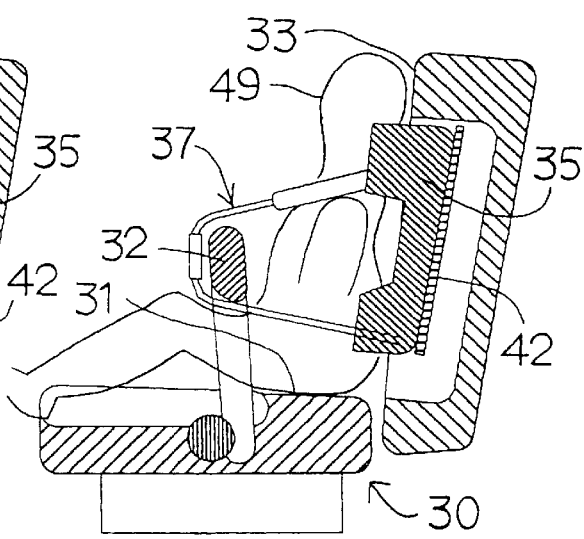

As shown in FIGS. 8A, 8B, 8C and 8D, the vehicle seat 30 can be modified to various configurations: the configuration in FIG. 8A when a child 46 who is a small elementary school student is sitting, the configuration in FIG. 8B when a child 47 who is an infant up to one year old is sitting, the configuration in FIG. 8C when a child 48, 2 to 3 years old, is sitting, and FIG. 8B when a child 49, 4 to 5 years old, is sitting. Thus, the seat 30 can be adjusted depending on the size of a child at various ages. When a relatively large child sits as shown in FIG. 8A, the seat 30 can be used by setting only the two seat belts 37 while the abdominal protecting pad 32 is housed in the sitting portion 31.

As described above, the side supporting members 35 and the seat belts 37 are movable in the vertical directions of the seat back portion 33, and the seat belts 37 and the side supporting members 35 can be securely set at the position adjusted to the size of the child who sits on the sitting portion 31. This results in an excellent restraining effect and a high degree of safety.

Each of the seat belts 37 consists of a shoulder belt 37a which restrains the shoulder of a child and the waist belt 37b which restrains the waist of a child. Accordingly, the shoulder and the waist are separately restrained so that even a young child having a small and supple body can be securely restrained. The other functions and advantages of this embodiment are the same as those of the vehicle seat 10 of the first embodiment.

Figure 9:
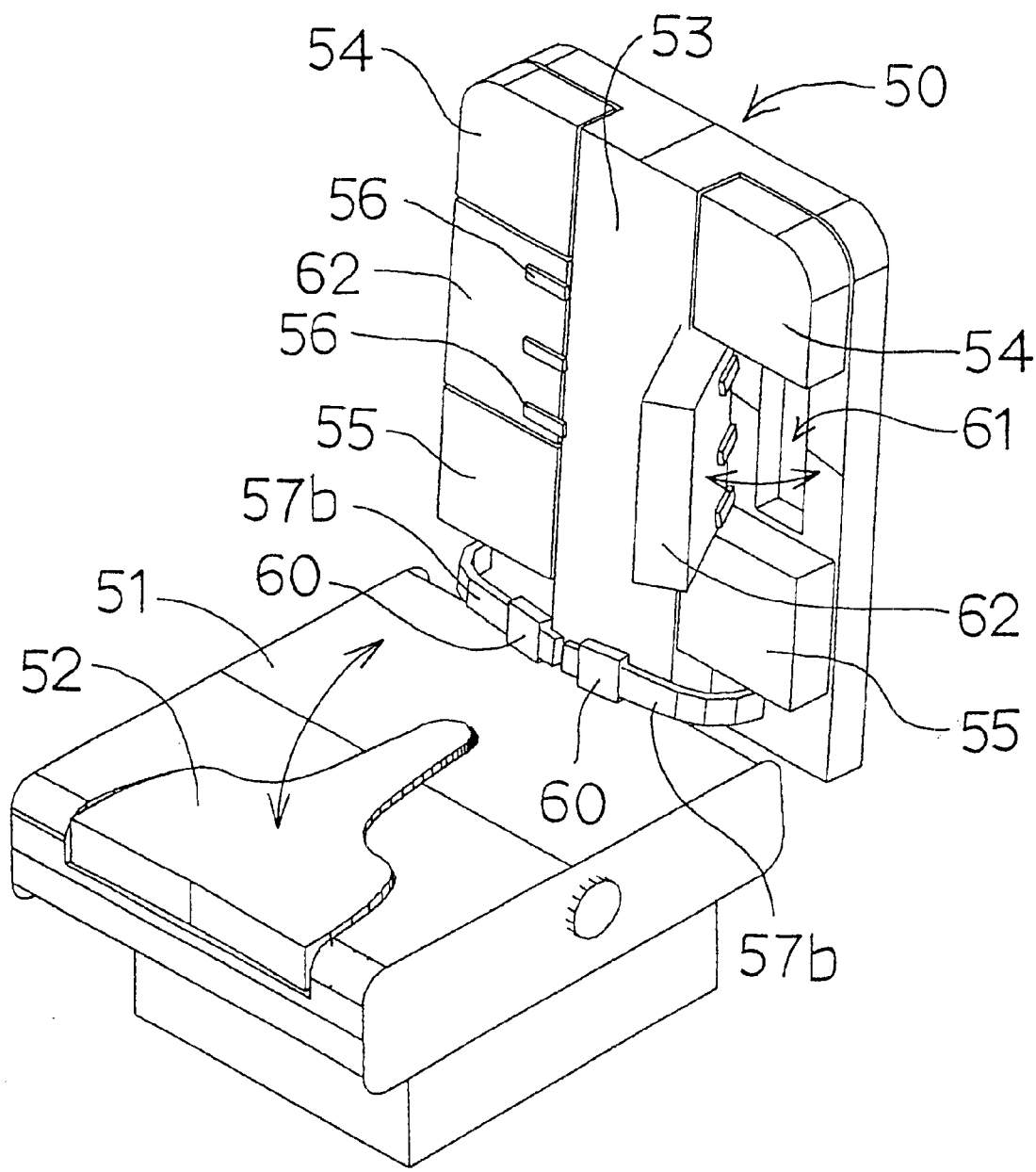
FIG. 9 is a perspective view of a third embodiment of a vehicle seat in accordance with the invention.
Figure 10:
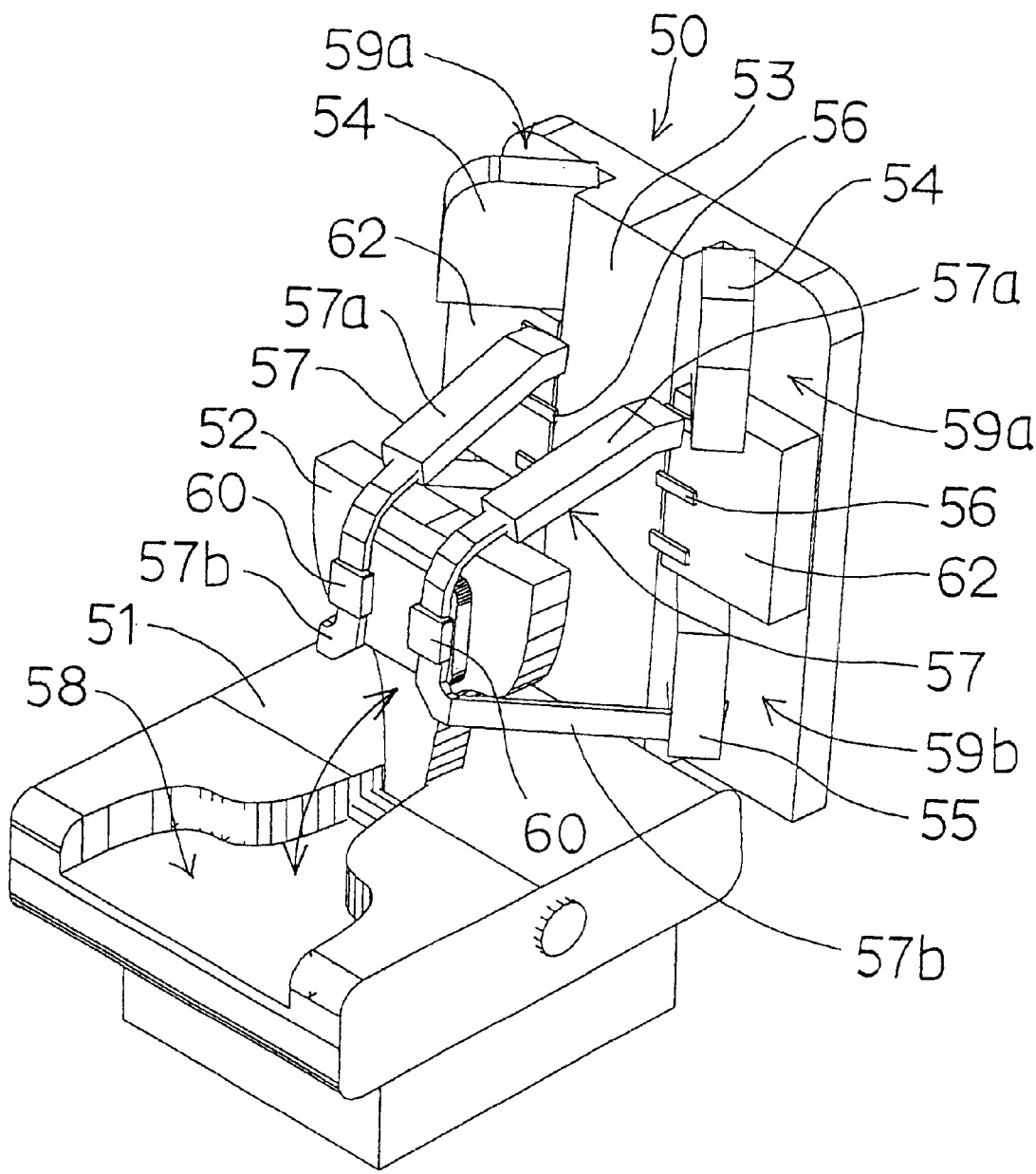
FIG. 10 is a perspective view showing the vehicle seat shown in FIG. 9 modified to a child's seat.
Figure 11:
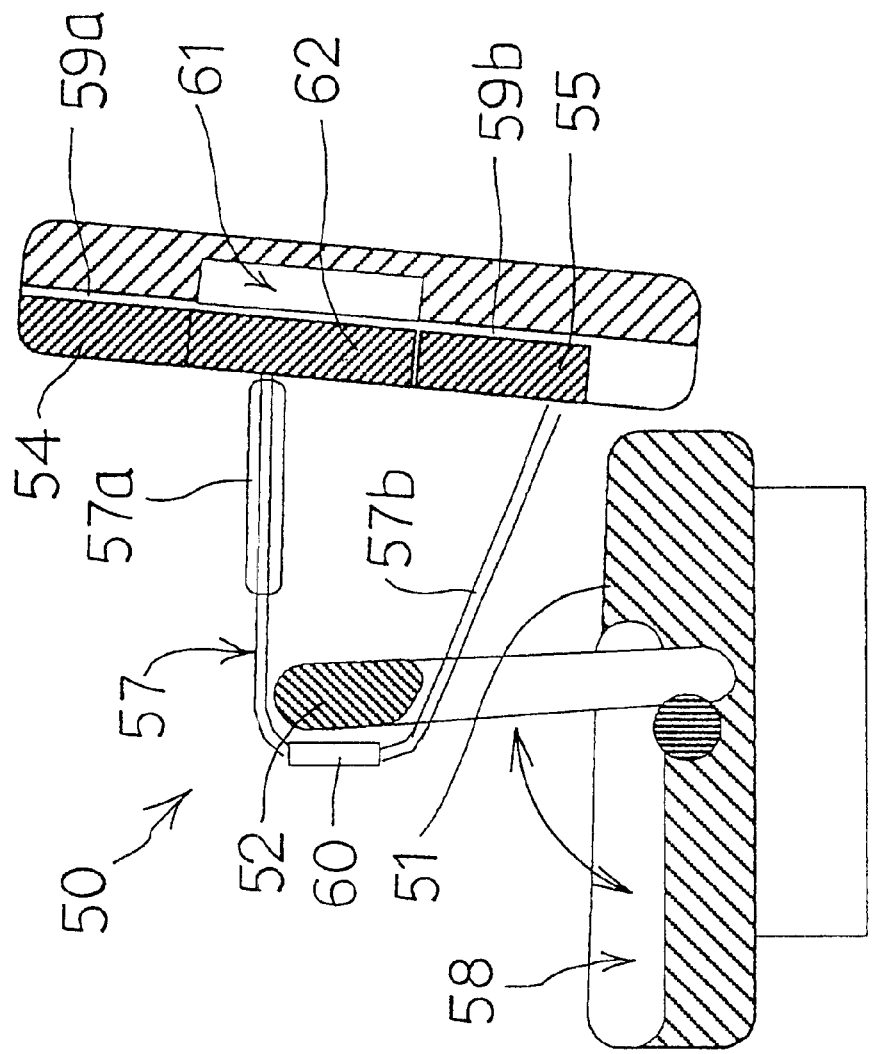
FIG. 11 is a longitudinal sectional view of the vehicle seat shown in FIG. 10.

Referring now to FIGS. 9–11, in a third embodiment of the present invention, a vehicle seat 50 comprises a sitting portion 51, an abdominal protecting pad 52 housed in the sitting portion 51 and which can rise out from the sitting portion 51, upper side supporting members 54 and lower side supporting members 55 which are housed on both sides of a seat back portion 53 and can be projected therefrom, and seat belts 57 which can be attached to the abdominal protecting pad 52 and connecting holes 56 arranged on the seat back portion 53.

When an adult sits on the vehicle seat 50, as shown in FIG. 9, the abdominal protecting pad 52 is housed in a concave portion 58 formed on the sitting portion 51, and the upper side supporting members 54 and the lower side supporting members 55 are housed in concave portions 59a, 59b formed on both sides of the seat back portion 53. Thus, the seat can be used as a normal vehicle seat. In this configuration, each of the seat belts 57 is divided into a shoulder belt 57a and a waist belt 57b, with the shoulder belt 57a stored in a concave portion 61 formed on the seat back portion 53 and the waist belt 57b connected to another waist belt 57b at the ends thereof with a connecting member 60 and stored in the lower end of the seat back portion 53. When used as a normal vehicle seat, the concave portion 61 is covered with an opening/closing member 62.

When a child sits on the vehicle seat 50, as shown in FIGS. 10 and 11, the abdominal protecting pad 52 is erected from the sitting portion 51, and the upper side supporting members 54 and the lower side supporting members 55 are projected from the seat back portion 53. The shoulder belts 57a and waist belts 57b, which are disconnected from one another and removed from the lower ends of the seat back portion 53, are connected by the connecting members 60. The connecting members 60 are then connected to the front surface of the abdominal protecting pad 52, and the upper ends of the shoulder belts 57a are connected to the connecting holes 56 to assemble the seat belt 57. The seat 50 can be easily modified to the child's seat by this series of steps and restored to the normal seat simply by performing the steps in reverse order.

The child on the vehicle seat 50 modified to the configuration of a child's seat is sitting on the original sitting position with his or her buttocks and back against the sitting portion 51 and the seat back portion 53 of the original seat, and his or her body is restrained by the abdominal protecting pad 52, the upper side supporting members 54, the lower side supporting members 55 and the seat belt 57. Therefore, excellent cushioning and restraining effects and high safety can be obtained.

The upper side supporting members 54 and the lower side supporting members 55 are separately movable and can be fixed in any desired positions. Accordingly, the seat 50 can be maintained at an appropriate position depending on the sizes of the buttocks and head of a child sitting on the seat. The other functions and advantages are the same as those of the vehicle seats 10 and 30 of the first and second embodiments.

While the vehicle seat according to the present invention is suitable for normal automobiles, it can be applicable to busses and trucks as well as seats in ships and aircraft.

What is claimed is:
1. A vehicle seat which can be modified to a child's seat and restored to a normal seat, comprising:

a seat back portion;

a sitting portion having a substantially T-shaped recess;

an abdominal protecting pad arranged to be inserted into said T-shaped recess of said sitting portion and rested on said sitting portion when inserted into said T-shaped recess, said abdominal protecting pad being mounted to said sitting portion about an axis such that said abdominal protecting pad is pivotable about said axis into an erect position;

side supporting members having a first position housed in said seat back portion and a second position projecting from said seat back portion; and seat belts attachable to and detachable from said abdominal protecting pad and said seat back portion.

2. The vehicle seat according to claim 1, wherein said seat belts are adjustable in a vertical direction.

3. The vehicle seat according to claim 1, wherein each of said seat belts consists of a shoulder belt extending between said seat back portion and said abdominal protecting pad for holding the shoulder of a child when sitting on said sitting portion and a waist belt extending between said seat back portion and said abdominal protecting pad for holding the waist of the child.

4. The vehicle seat according to claim 1, wherein said side supporting members are insertable into concave portions formed on both sides of said seat back portion when said supporting members are in said first position and are mounted on said seat back portion such that said side supporting members are projecting from said seat back portion into said second position.

5. The vehicle seat according to claim 1, wherein said abdominal protecting pad is pivotally mounted to said sitting portion about said axis such that said abdominal protecting pad is movable between a first position in said T-shaped recess and a second position pivoted upwardly from said sitting portion.

6. The vehicle seat according to claim 1, wherein said side supporting members are adjustable in a vertical direction.

7. The vehicle seat according to claim 1, wherein said seat belts and said side supporting members are adjustable in a vertical direction.

8. The vehicle seat according to claim 1, wherein said seat belts are housed in said seat back portion.

9. The vehicle seat according to claim 1, wherein said seat belts are housed in said side supporting members.

10. The vehicle seat according to claim 1, wherein said seat back portion has two sides and a recess on each of said two sides, each of said side supporting members being housed in a respective one of said recesses.

11. The vehicle seat according to claim 1, wherein said T-shaped recess in said sitting portion is a concave recess.

12. The vehicle seat according to claim 1, wherein said T-shaped recess is formed in said sitting portion such that said abdominal protecting pad is insertable into said sitting portion.

13. The vehicle seat according to claim 1, wherein each of said seat belts comprises a shoulder belt and a waist belt, further comprising a connecting member arranged on said abdominal protecting pad and engageable with said waist belts and said shoulder belts.

14. The vehicle seat according to claim 13, wherein said shoulder belts are stored in said side supporting members and said waist belts are detachably connected at ends thereof and stored proximate a lower end of said seat back portion.

15. The vehicle seat according to claim 1, wherein said seat back portion includes connecting holes, and each of said seat belts including an end detachably engageable with a respective one of said connecting holes on said seat back portion.

16. The vehicle seat according to claim 1, wherein said abdominal protecting pad is mounted on said sitting portion about an axis enabling said abdominal protecting pad to rise from a position resting on said sitting portion.

17. The vehicle seat according to claim 1, wherein said seat back portion includes recesses, said side supporting members being housed in said recesses of said seat back portion when in said first position, said seat belts being stored in said recesses of said seat back portion.

18. The vehicle seat according to claim 1, wherein said seat back portion includes a frame, further comprising a mounting board housed in said seat back portion, said side supporting members being attached to said mounting board and lower ends of said seat belts being attached to said side supporting members, said mounting board being movable relative to said frame.

19. The vehicle seat according to claim 18, wherein said frame includes guide pins and said mounting board includes cutouts arranged to mate with said guide pins to secure said mounting board to said frame.

20. The vehicle seat according to claim 1, wherein said side supporting members comprise upper side supporting members arranged on each side of said seat back portion at an upper part of said seat back portion and lower side supporting members arranged on each side of said seat back portion at a lower part of said seat back portion.

\* \* \* \* \*